(12) United States Patent
Uchida et al.

(10) Patent No.: US 6,550,456 B1  
(45) Date of Patent: Apr. 22, 2003

(54) COMBUSTION STATE DETECTION APPARATUS FOR INTERNAL COMBUSTION ENGINE

(75) Inventors: Toshio Uchida, Hyogo (JP); Yasuhiro Takahashi, Tokyo (JP); Koichi Okamura, Tokyo (JP); Mitsuru Koiwa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/261,579

(22) Filed: Oct. 2, 2002

(30) Foreign Application Priority Data

Apr. 17, 2002 (JP) ........................................ 2002-114705

(51) Int. Cl.⁷ ............................................... F02M 51/00
(52) U.S. Cl. .................. 123/479; 73/35.08; 123/406.14
(58) Field of Search .......................... 123/479, 406.14, 123/406.37, 630; 73/35.08, 116, 117.3; 324/399, 380

(56) References Cited

U.S. PATENT DOCUMENTS

| | | | | |
|---|---|---|---|---|
| 5,359,882 A | * | 11/1994 | Fukui | 73/117.3 |
| 5,561,239 A | * | 10/1996 | Yasuda | 73/35.08 |
| 5,701,876 A | * | 12/1997 | Morita et al. | 123/630 |
| 5,755,206 A | * | 5/1998 | Takahashi et al. | 123/406.37 |
| 5,945,828 A | * | 8/1999 | Katogi et al. | 324/399 |
| 6,054,859 A | * | 4/2000 | Takahashi et al. | 324/399 |

FOREIGN PATENT DOCUMENTS

| | | |
|---|---|---|
| JP | 10-220334 A | 8/1998 |
| JP | 10-231772 A | 9/1998 |
| JP | 10-318116 A | 12/1998 |

* cited by examiner

Primary Examiner—John Kwon  
(74) Attorney, Agent, or Firm—Sughrue Mion, PLLC (57) ABSTRACT

A combustion state detection apparatus for an internal combustion engine has a detection period limit section, which limits a detection period of an ion current processed in misfire detection section or knock detection section.

6 Claims, 10 Drawing Sheets

COMBUSTION STATE DETECTION APPARATUS FOR INTERNAL COMBUSTION ENGINE

BACKGROUND OF THE INVENTION

1. Field of the Invention

This invention relates to a combustion state detection apparatus for an internal combustion engine for detecting at least a misfire of the internal combustion engine and occurrence of knocking by detecting a change in the amount of ion caused by combustion in the internal combustion engine.

2. Description of the Related Art

With regard to a combustion state detection apparatus for an internal combustion engine according to the related art, a revolution change type misfire detection function for detecting a change in the number of revolutions of the internal combustion engine at the time of a misfire by a sensor has been proposed in order to detect continuous misfires and warn an operator of the internal combustion engine.

Also, a combustion state detection apparatus for an internal combustion engine using an ion current indicates excellent misfire detectability even in a multiple cylinder engine in which misfire detection accuracy drops in the revolution change type, and can detect a misfire every cylinder. The combustion state detection apparatus using ion current has variously been proposed.

In an apparatus described in JP-A-Hei.10-231772, the fact that a determination of a combustion state (presence or absence of misfire) of an internal combustion engine is made by an ion current is indicated.

Figure 1:
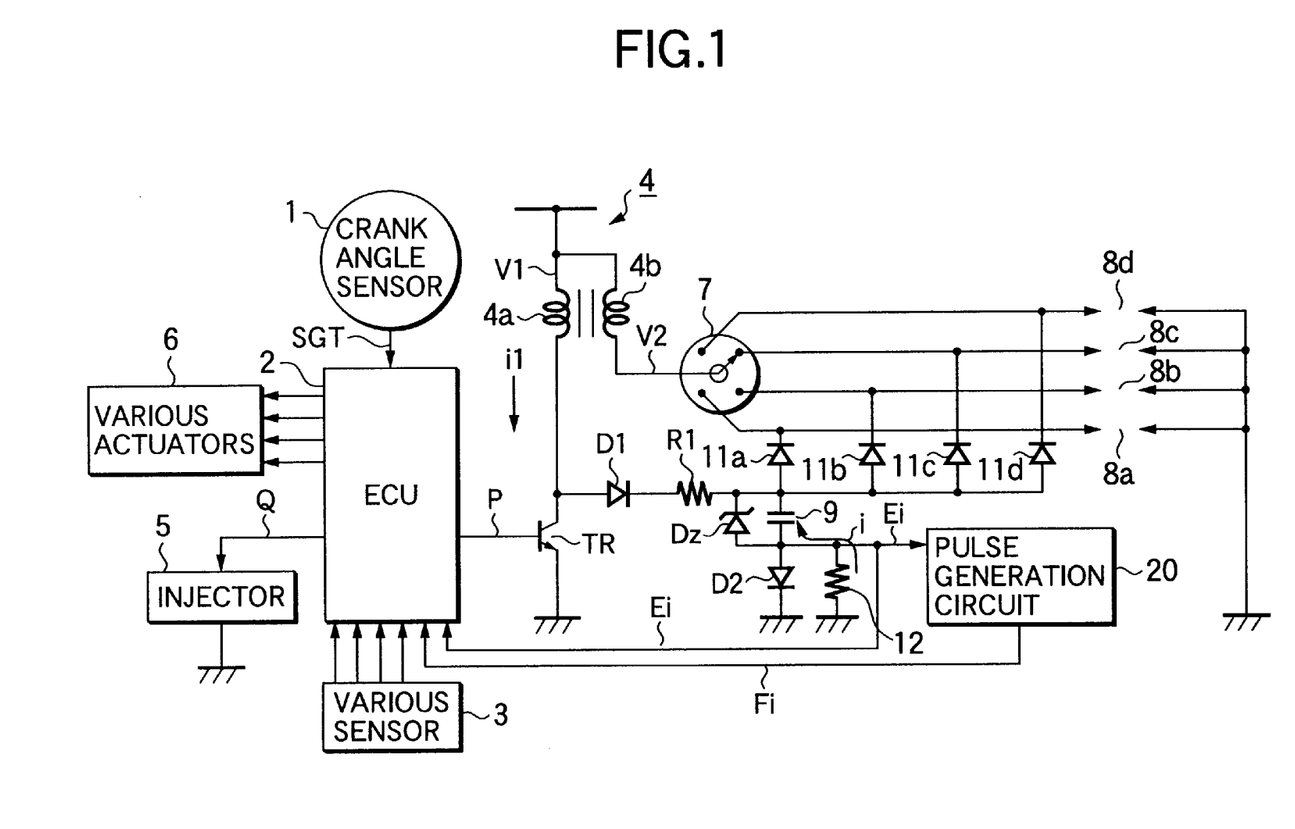
FIG. 1 is a block diagram showing a apparatus according to the related art.

FIG. 1 is a block diagram schematically showing a combustion state detection apparatus for an internal combustion engine according to the related art.

An example according to the related art will be described below on the basis of this block diagram. A system shown in FIG. 1 shows the case of performing high voltage distribution through a distributor 7 with respect to spark plugs 8a to 8d of each cylinder.

First, an ECU 2 outputs an ignition signal P for energizing and breaking a power transistor TR based on a crank angle signal SGT from a crank angle sensor 1. The power transistor TR energizes a primary current i1 at the time when the ignition signal P is a high level, and breaks the primary current i1 at the time when the ignition signal P is a low level.

At this time, a primary voltage Vi stepped up occurs in a primary winding 4a and thereby, a capacitor 9 is charged through a charging current path comprising a rectifying diode D1, a resistor R, the capacitor 9 and a rectifying diode D2. The charging of the capacitor 9 is completed at a point of time when a charging current of the capacitor 9 becomes equal to a reverse breakdown voltage (bias voltage VBi) of a Zener diode DZ.

The capacitor 9, the Zener diode DZ and the diode D2 form a bias section. charging is performed by a high voltage occurring in the low voltage side of the primary winding 4a at the time of breaking the primary current i1.

When the primary voltage V1 occurs in the primary winding 4a, a secondary winding 4b generates a secondary voltage V2 of several 10 kV increased as a high voltage for ignition. The secondary winding 4b applies the voltage to the spark plugs 8a to 8d of each of cylinders through the distributor 7 and generates a spark discharge in the spark plug of the cylinder targeted for ignition control to burn mixed gas.

When the mixed gas burns, an ion occurs inside a combustion chamber of a combustion cylinder so that an ion current i flows by the bias voltage VBi charged in the capacitor 9. The ion current i becomes an ion current detection signal Ei through a resistor 12.

A pulse generation circuit 20 generates and outputs a combustion pulse Fi to the ECU 2 only for a period during which the ion current detection signal Ei exceeds a threshold value. The ECU 2 determines whether the combustion cylinder of this time has burned or misfired based on that if a width of this pulse Fi is a predetermined value or more.

The ion currents detected in each of cylinders are combined and are inputted to the pulse generation circuit which is misfire detection section through one signal line. A detection period of the ion current is not limited in the related art. Therefore, there is a problem that a misfire detection signal, which is processed in a state where an ion current during an exhaust stroke of the previous cylinder is added to an ion current during a combustion stroke of a target cylinder, is transmitted and a misfire cannot be detected correctly.

Figure 2:
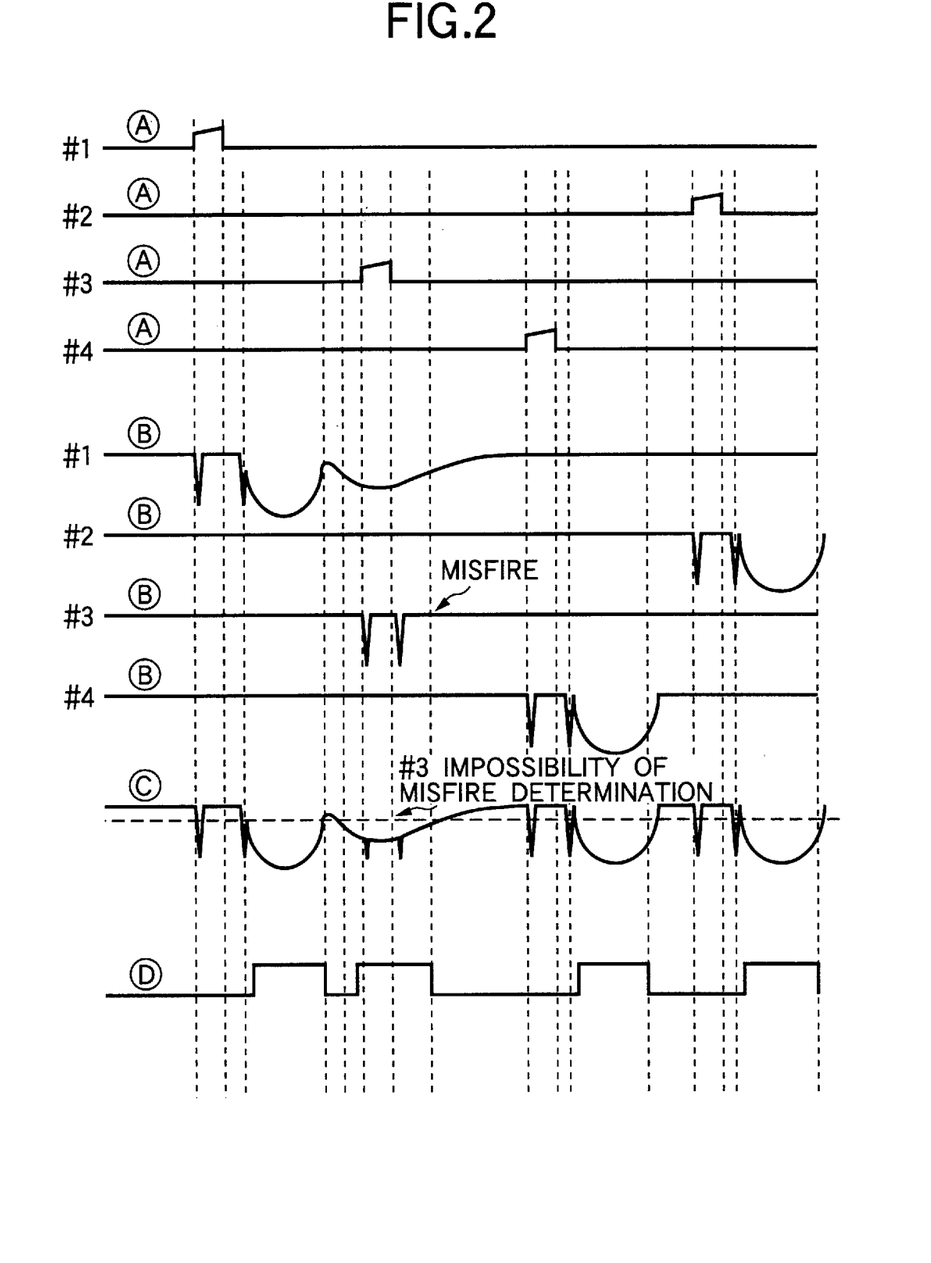
FIG. 2 is a timing chart showing the apparatus according to the related art.

FIG. 2 is a timing chart of the case that an ion current occurs to a combustion stroke of the next cylinder in a combustion state detection apparatus of a system according to the related art.

In FIG. 2, A is an ignition coil driving signal of each of cylinders. B is an ion current occurring in each of cylinders. C is a signal occurring in the Ei in the block diagram of FIG. 1. D is a signal occurring in the Fi in the block diagram of FIG. 1. In the present drawing, a third cylinder misfires and a first cylinder generates an ion current over a long time period. In a configuration of the example according to the related art, only one bias circuit is provided with respect to all the cylinders, so that the ion currents occurring in each of cylinders are added and are detected by an Ei portion. The ion currents detected by the Ei portion is subjected to a waveform shaping by the pulse generation circuit 20 and becomes the Fi. Therefore, when the ion current as shown in B occurs in each of cylinders, the Fi occurs during a combustion stroke of the third cylinder even though the third cylinder has misfired, so that a determination of combustion is made.

As described above, in the apparatus according to the related art, a bias voltage is applied from one bias circuit to the spark plug of each of cylinders through a high voltage diode and the ion currents of each of cylinders are detected and as a result, a signal in which the detected ion currents are added is obtained. However, since the ion currents may continue to occur to the exhaust stroke as well as the combustion stroke, in this configuration, there was a problem that, for example, even when the cylinder on detection has misfired, the misfire cannot be detected in the case that the ion current of the previous cylinder occurs over a long time and continues to the combustion stroke of the cylinder in question.

Also, when knock detection is performed by a vibration component superimposed on the ion current, there is a problem that a knock determination is made even when the cylinder in question does not cause a knock, for example, in the case that the previous cylinder similarly generates the ion current over a long time and noise vibration is included during the combustion stroke of the cylinder in question.

When the bias section and ion current detection section are provided every all the cylinders and an input signal to the ECU is also provided every the cylinder, such a problem does not arise, but it is necessary to increase a portion shared with plural cylinders as much as possible in order to achieve a reduction in cost and a reduction in the number of input signal lines.

SUMMARY OF THE INVENTION

According to an embodiment of the invention, there is provided a combustion state detection apparatus for an internal combustion engine including an angle sensor, an ECU, an ignition coil, a spark plug, a bias section, an ion current detection section, at least one of a misfire detection section and a knock detection section, at least one of a misfire determination section and a knock determination section, and a detection period limit section. The angle sensor detects a revolution angle of the internal combustion engine. The ECU performs fuel injection and ignition control based on revolution information from the angle sensor. The ignition coil generates a high voltage for ignition based on a driving signal from the ECU. The spark plug generates an ignition spark to ignite mixed gas by applying the high voltage for ignition of the ignition coil. The bias section applies a bias voltage for ion current detection to the spark plug. The ion current detection section detects an ion current. The misfire detection section performs misfire detection based on the ion current detected by the ion current detection section. The knock detection section performs knock detection based on the ion current detected by the ion current detection section. The misfire determination section and the knock determination section perform misfire determination and knock control based on an output signal of the misfire detection section and knock detection section, respectively. The detection period limit section limits a detection period of the ion current processed in the at least one of the misfire detection section and the knock detection section.

Even when an ion current on a combustion stroke of the previous cylinder reaches a combustion stroke of a target cylinder in a case of unifying the number of output signal lines to the ECU or sharing with plural cylinders, a detection period of the ion current is limited to a range of the combustion stroke of the target cylinder. Therefore, misfire detection or knock detection can be performed correctly.

DETAILED DESCRIPTION OF THE PREFERRED EMBODIMENTS

First Embodiment

Figure 3:
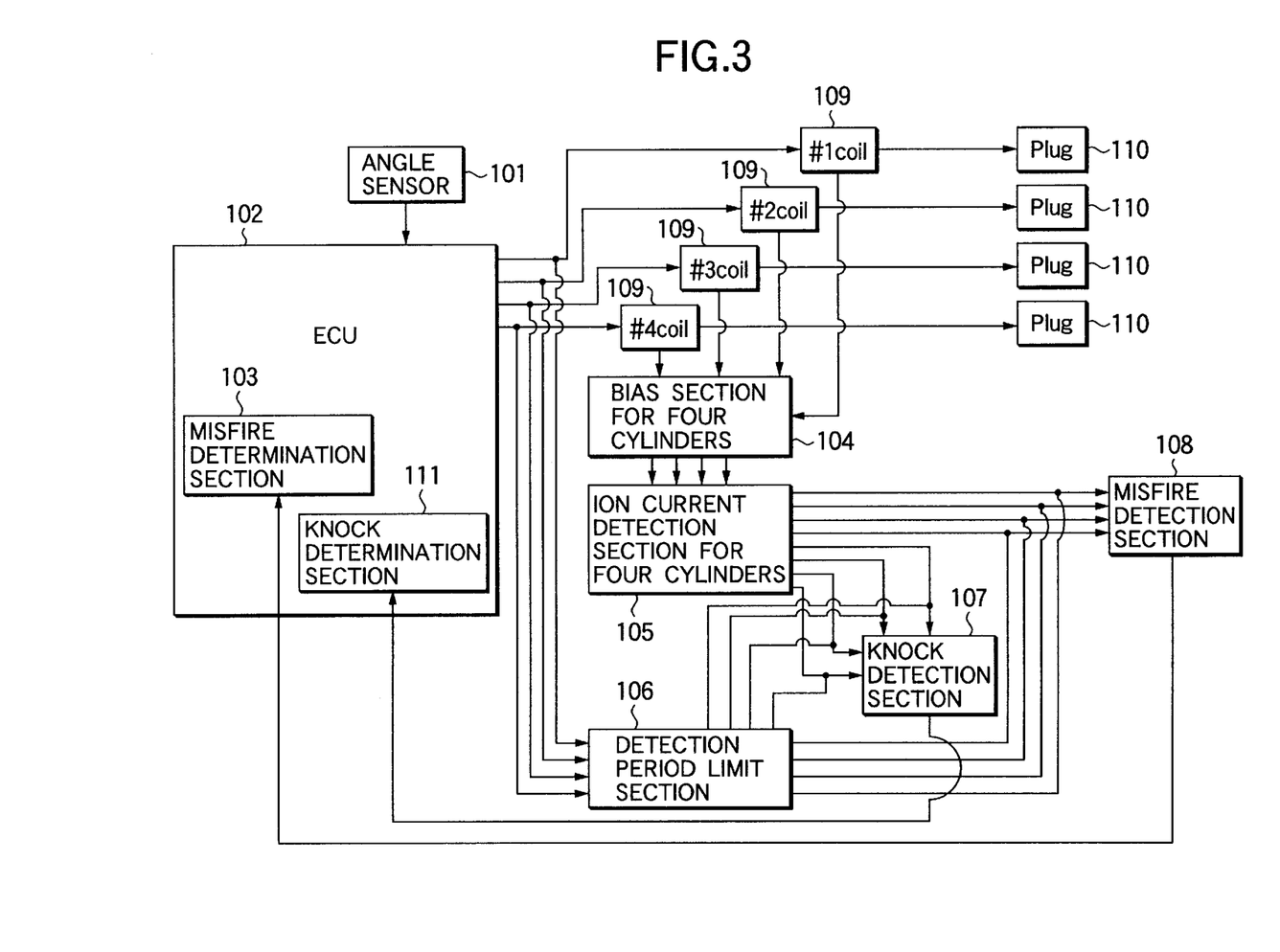
FIG. 3 is a block diagram showing a first embodiment of the invention.

FIG. 3 is a block diagram schematically showing a combustion state detection apparatus for an internal combustion engine according to the first embodiment (here, a four-cylinder engine). With regard to an ion current inputted to misfire detection section 108 and knock detection section 104, the ion currents of all the cylinders are combined into one line.

Spark plugs 110, ignition coils 109, bias sections 104 and ion current detection sections 105 are disposed in cylinders, respecitvely. An ion current flows in order of the ion current detection section 105, the bias section 104, the ignition coil 109 and the spark plug 110. The ion current detection section 105 includes, for example, a current mirror circuit, and outputs a current similar to the ion current flowing out in a direction of the bias section 104 to plural lines. This output current is inputted to a misfire detection section 108 and a knock detection section 107 every cylinder.

The misfire detection section 108 and the knock detection section 107 have an input I/F every cylinders. For example, there is a configuration in which after a diode is inserted in series, a line of each of cylinders is connected to this I/F and is connected to a detection resistor.

The misfire detection section 108 performs waveform shaping and timer processing with respect to an ion current signal formed into one signal of all the cylinders thus, and outputs the signal to a misfire determination section 103 as a misfire detection pulse. Also, the knock detection section 107 performs waveform shaping after extracting a vibration component with respect to an ion current signal formed into one signal of all the cylinders similarly, and outputs the signal to a knock control section 107 as a knock detection pulse.

Figure 6:
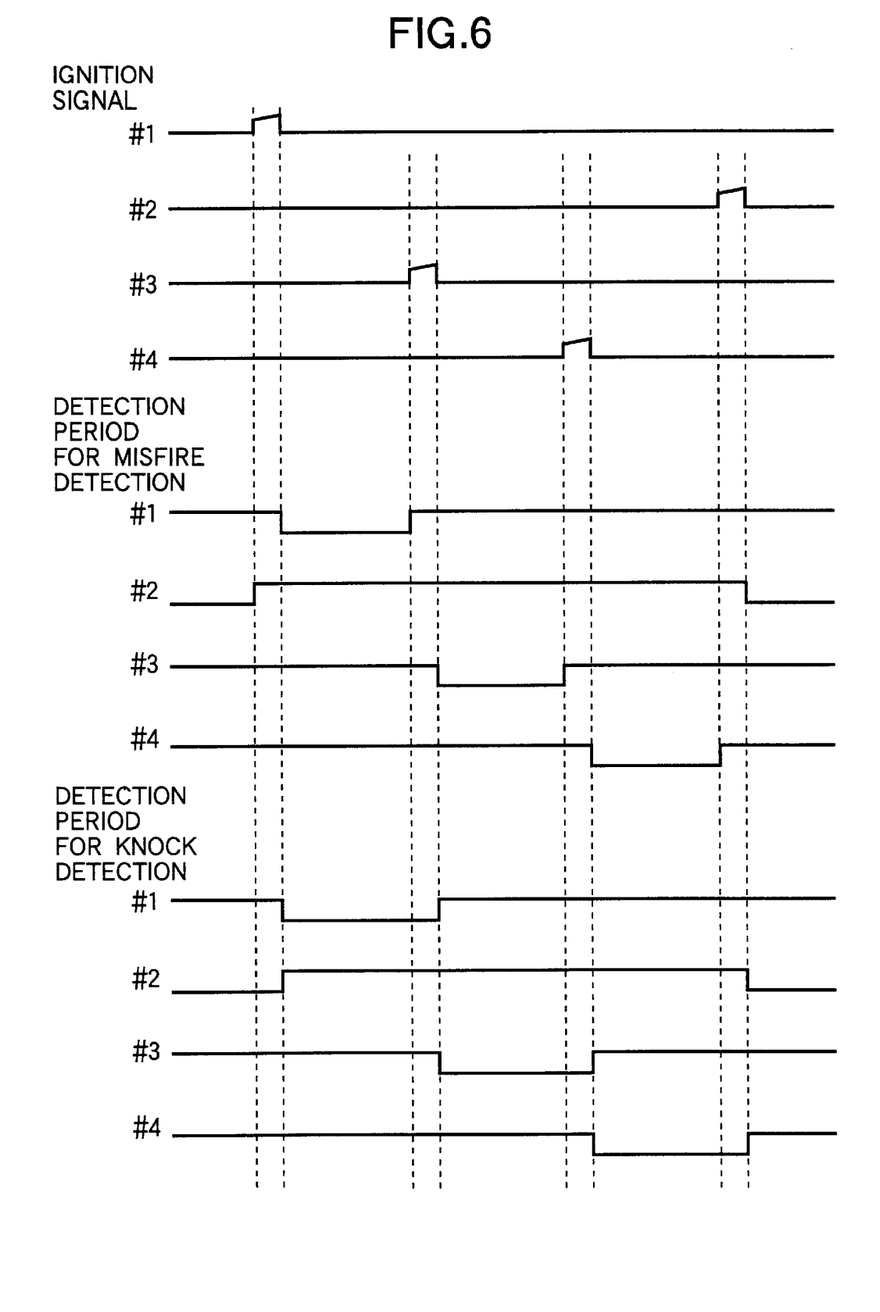
FIG. 6 is a timing chart showing a detection period of the first embodiment of the invention.

A detection period limit section sets an ignition signal from the ECU 102 to the ignition coil to an input, and sets a detection period of each of cylinders for misfire detection to a period from the time (ignition time) of the ignition signal end of the cylinder to the time of the ignition signal start of the next cylinder as shown in FIG. 6. This is because electric noise occurring by the energization start of a coil of the next cylinder is prevented from riding on an ion current detection line. Also, a detection section of each of cylinders for knock detection is set to a period from the time (ignition time) of the ignition signal end of the cylinder to the time (ignition time) of the ignition signal end of the next cylinder.

A digital processing circuit using a flip-flop is considered as a configuration of the detection period limit section. A low interval of each detection period signal shown in FIG. 6 becomes a detection period of the cylinder. In a high interval, an input current from the ion current detection section 105 to the misfire detection section 108 or the knock detection section 107 is sucked by the detection period limit section 106 and thereby is not transmitted.

Figure 4:
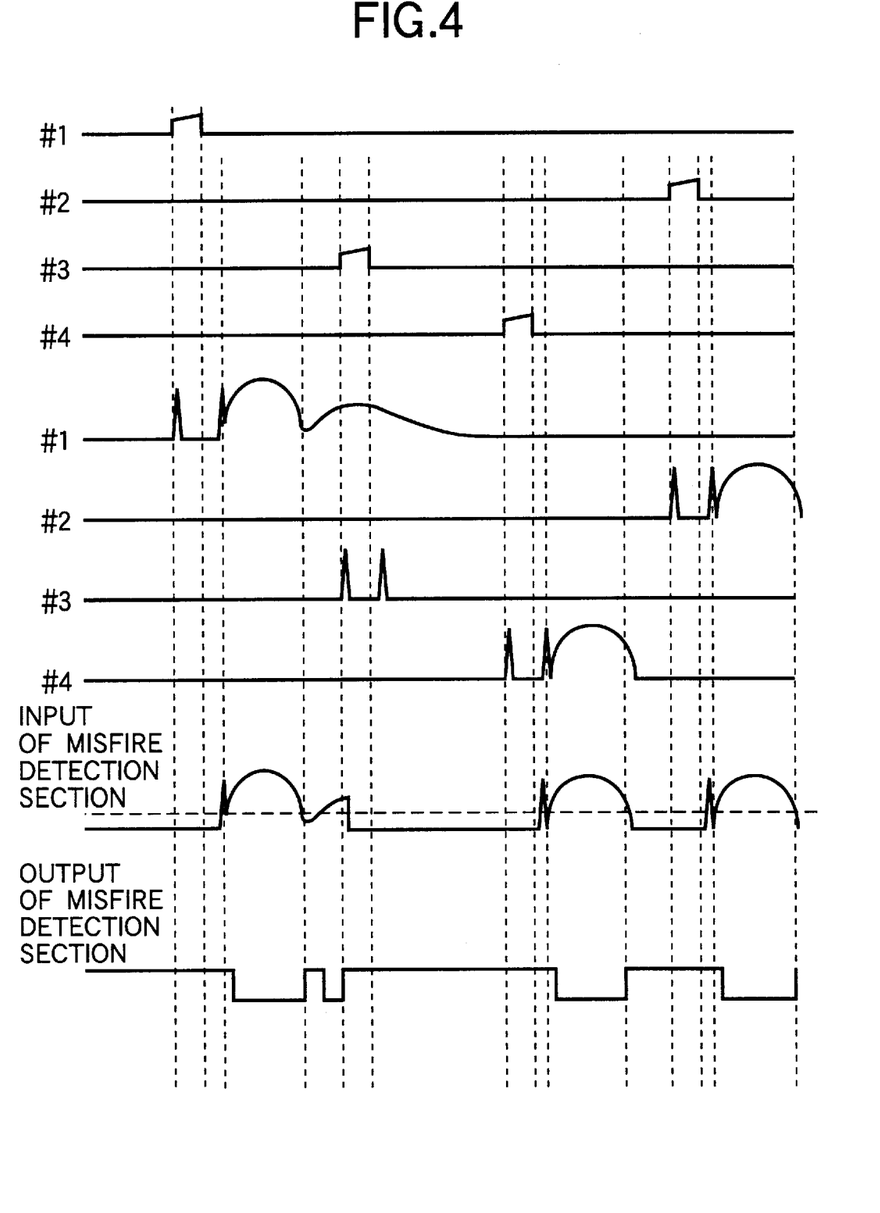
FIG. 4 is a timing chart showing the first embodiment of the invention (at the time of misfire)
Figure 5:
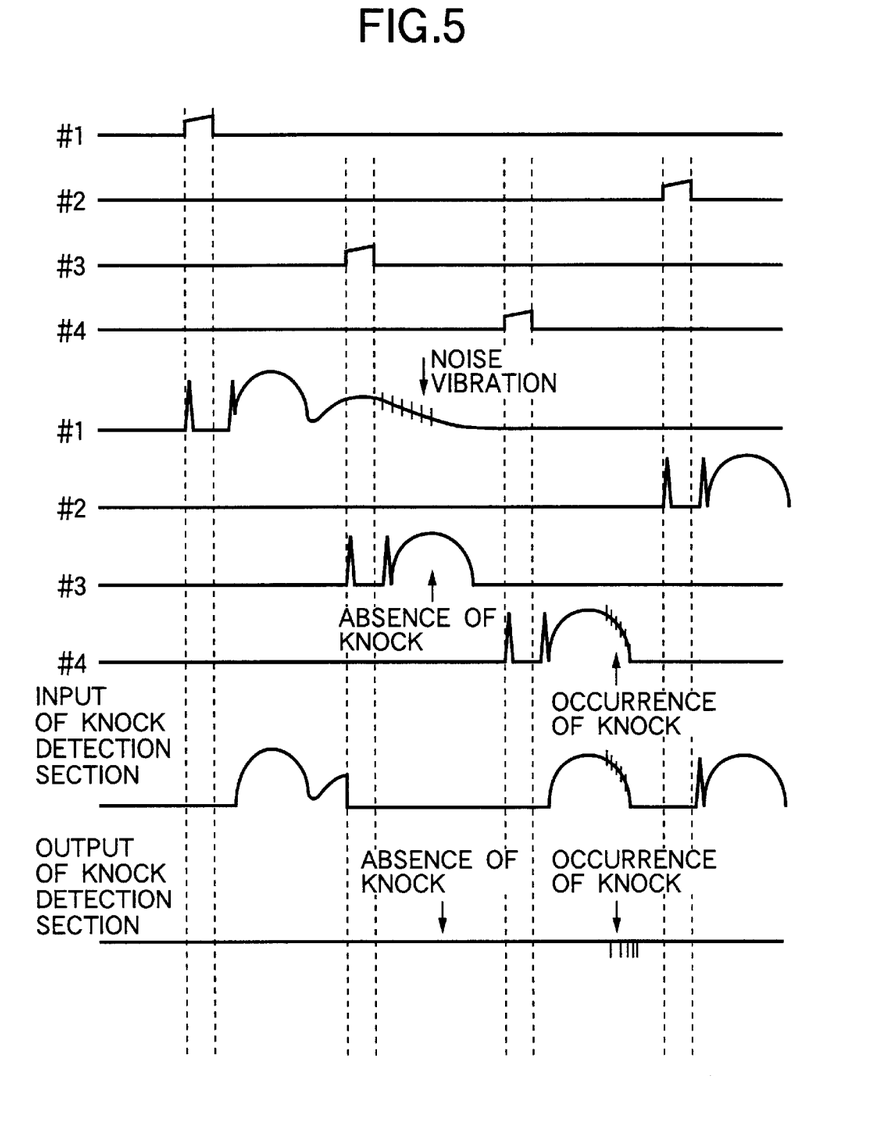
FIG. 5 is a timing chart showing the first embodiment of the invention (at the time of knock)

Therefore, as shown in FIG. 4, a misfire of a third cylinder can be detected even when an ion current occurs in a first cylinder for a long time. Also, as shown in FIG. 5, it is not determined by mistake that a knock occurs in a third cylinder even when an ion current occurs in a first cylinder for a long time and noise vibration is superimposed.

In the embodiment, it is formed into the configuration in which the ignition signal is provided and the detection period limit section 106 limits a detection period. However, since the bias section 104 installed in each of cylinders is charged by a secondary current of the ignition coil, ignition is identified by a voltage drop occurring inside the bias section 104 at the time when the secondary current flows and periods other than a period from ignition to ignition can be limited without supplying the ignition signal to the detection period limit section 106.

Also, the number of input signal lines to the ECU 102 cannot be reduced, but the bias section 104 and the ion current detection section 105 are built into the ignition coil every cylinder. A current similar to an ion current is directly outputted to the ECU 102. The detection period limit section 106 can be provided inside the ECU. In this case, a CPU can limit a detection period of each of cylinders in further detail based on a signal of a crank angle sensor 101.

Second Embodiment

Figure 7:
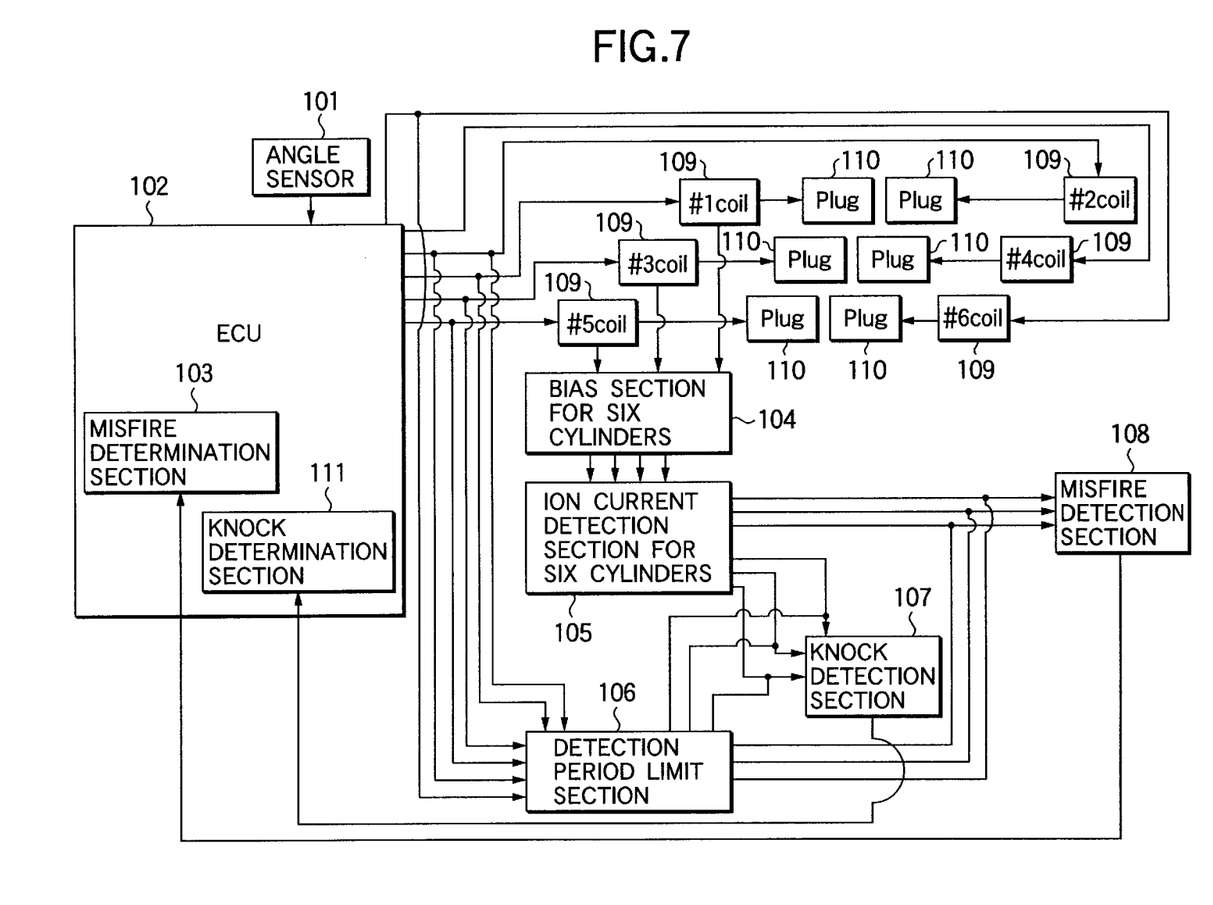
FIG. 7 is a block diagram showing a second embodiment of the invention.

FIG. 7 is a block diagram showing a system configuration example in a six-cylinder engine according to the second embodiment. In the six-cylinder engine, an ignition interval is 120° at a crank angle and a combustion stroke overlaps, so that, for example, in the case that a detection period to knock detection section 107 is set to a period from ignition of the cylinder to ignition of the next cylinder as shown in the first embodiment, all the ion currents on the combustion stroke of the cylinder cannot be detected. Therefore, in the six-cylinder engine, this problem is solved by performing processing every one-sided bank (first, third, fifth cylinder). However, in this case, misfire detection and knock detection signals are required by at least two channels, respectively. Incidentally, only the one-sided banks (first, third, fifth cylinders) are illustrated in FIG. 7 for the sake of simplicity, and thereafter an operation will be described by only the one-sided banks. Also in banks of the opposite side, the same processing is merely performed naturally.

Figure 10:
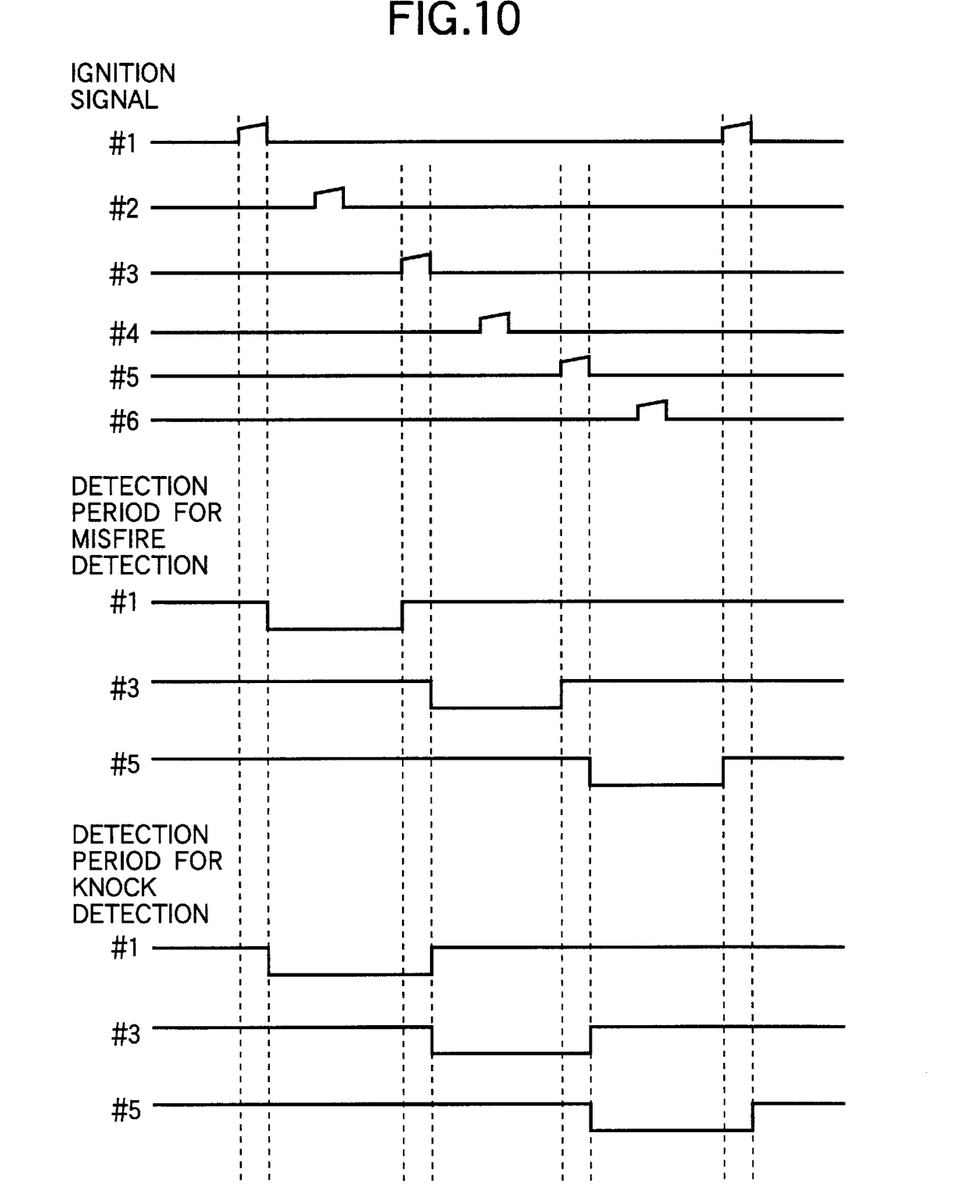
FIG. 10 is a timing chart showing a detection period of the second embodiment of the invention.

A low interval of each detection period signal shown in FIG. 10 becomes a detection period of the cylinder. In a high interval, an input current from the ion current detection section 105 to the misfire detection section 108 or the knock detection section 107 is sucked by the detection period limit section 106 and thereby is not transmitted.

A low interval of each detection period signal shown in FIG. 6 becomes a detection period of the cylinder. In a high interval, an input current from the ion current detection section 105 to the misfire detection section 108 or the knock detection section 107 is sucked by the detection period limit section 106 and thereby is not transmitted.

Figure 8:
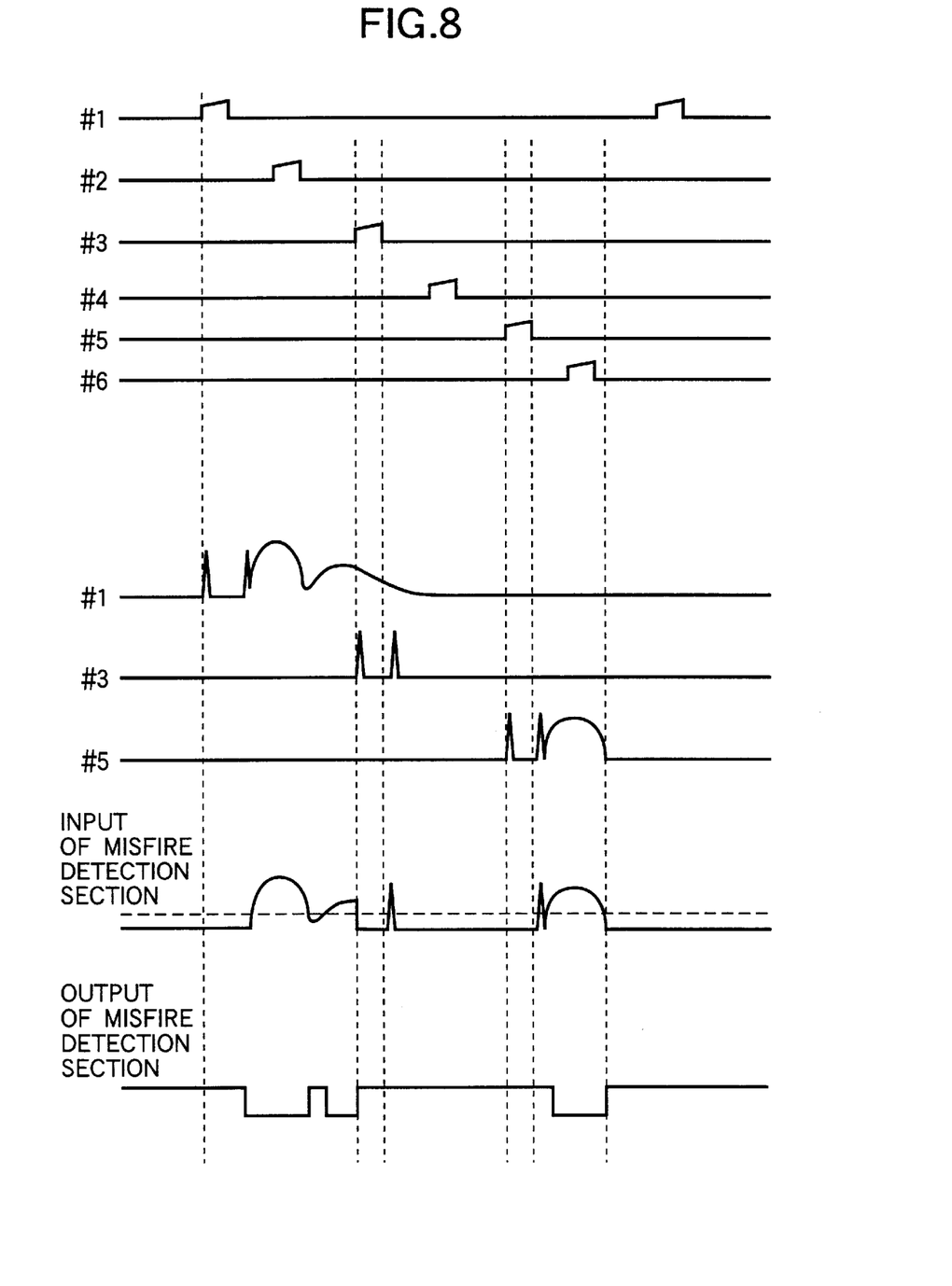
FIG. 8 is a timing chart showing the second embodiment of the invention (at the time of misfire)
Figure 9:
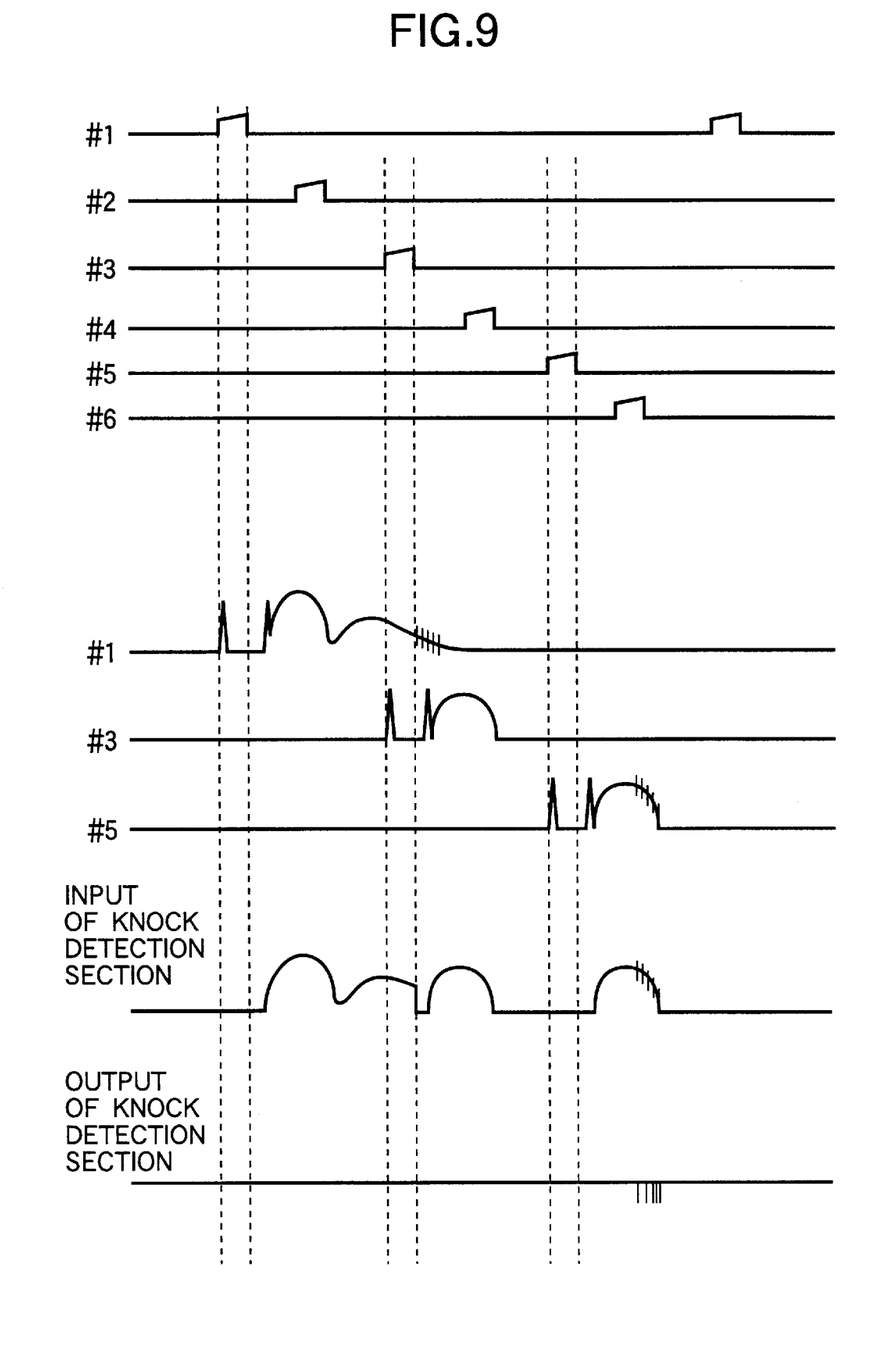
FIG. 9 is a timing chart showing the second embodiment of the invention (at the time of knock)

Therefore, as shown in FIG. 8, a misfire of a third cylinder can be detected even when an ion current occurs in a first cylinder for a long time. Also, as shown in FIG. 9, it is not determined by mistake that a knock occurs in a third cylinder even when an ion current occurs in a first cylinder for a long time and noise vibration is superimposed.

What is claimed is:

1. A combustion state detection apparatus for an internal combustion engine comprising:

an angle sensor which detects a revolution angle of the internal combustion engine;

an ECU which performs fuel injection and ignition control based on revolution information from the angle sensor;

an ignition coil which generates a high voltage for ignition based on a driving signal from the ECU;

a spark plug which generates an ignition spark to ignite mixed gas by applying the high voltage for ignition of the ignition coil;

a bias section which applies a bias voltage for ion current detection to the spark plug;

an ion current detection section which detects an ion current;

at least one of a misfire detection section, which performs misfire detection based on the ion current detected by the ion current detection section, and a knock detection section, which performs knock detection based on the ion current detected by the ion current detection section;

at least one of a misfire determination section and a knock determination section, which performs one of misfire determination and knock control based on an output signal of the at least one of the misfire detection section and the knock detection section; and a detection period limit section which limits a detection period of the ion current processed in the at least one of the misfire detection section and the knock detection section.

2. The combustion state detection apparatus according to claim 1, wherein the bias section and the ion current detection section correspond to each of cylinders of the internal combustion engine;

wherein number of at least one of the misfire determination section and the knock determination section is smaller than number of the cylinders of the internal combustion engine; and wherein a detection period of a signal of each of cylinders is limited by the detection period limit section in a case of combining signals of the plural cylinders at a time when signal is transmitted from the ion current detection section to the at least one of the misfire detection section and the knock detection section or at a time when signal is transmitted from the at least one of the misfire detection section and the knock detection section to the at least one of the misfire determination section and the knock determination section.

3. The combustion state detection apparatus according to claim 1, wherein the detection period limit section limits the detection period of the ion current based on a driving signal of the ignition coil of each of cylinders.

4. The combustion state detection apparatus according to claim 1, wherein the detection period limit section limits the detection period of the ion current by using different detection periods in knock detection and misfire detection.

5. The combustion state detection apparatus according to claim 4, wherein in the misfire detection, the detection period limit section sets the detection period of the ion current of each of cylinders to a period from ignition time of one cylinder to time of energization start of the ignition coil of next cylinder, which does not overlap with the one cylinder at a combustion stroke.

6. The combustion state detection apparatus according to claim 4, wherein in the knock detection, the detection period limit section sets the detection period of the ion current of each of cylinders to a period from ignition time of one cylinder to ignition time of next cylinder, which does not overlap with the one cylinder at a combustion stroke.

* * * * *